(12) United States Patent
Massicot et al.

(10) Patent No.: US 11,057,463 B2
(45) Date of Patent: Jul. 6, 2021

(54) METHOD FOR SYNCHRONIZING CONTEXT DATA OF NETWORK FUNCTIONS IN A MOBILE NETWORK

(71) Applicant: ORANGE, Issy-les-Moulineaux (FR)

(72) Inventors: Bernard Massicot, Issy les Moulineaux (FR); Khadija Daoud Triki, Meudon (FR); Lars Kiessling, Chemnitz (DE)

(73) Assignee: ORANGE, Issy-les-Moulineaux (FR)

( * ) Notice: Subject to any disclaimer, the term of this patent is extended or adjusted under 35 U.S.C. 154(b) by 89 days.

(21) Appl. No.: 16/314,155

(22) PCT Filed: Jun. 29, 2017

(86) PCT No.: PCT/FR2017/051739
§ 371 (c)(1),
(2) Date: Dec. 28, 2018

(87) PCT Pub. No.: WO2018/002531
PCT Pub. Date: Jan. 4, 2018

(65) Prior Publication Data
US 2019/0230158 A1     Jul. 25, 2019

(30) Foreign Application Priority Data
Jun. 30, 2016   (FR) ...................................... 1656153

(51) Int. Cl.
*H04L 29/08*         (2006.01)
*H04W 36/00*       (2009.01)
(Continued)

(52) U.S. Cl.
CPC .......... *H04L 67/1095* (2013.01); *G06F 11/00* (2013.01); *H04L 67/141* (2013.01);
(Continued)

(58) Field of Classification Search
CPC .... H04L 67/1095; H04L 67/141; G06F 11/00; H04M 7/00; H04M 2242/40;
(Continued)

(56) References Cited

U.S. PATENT DOCUMENTS

2008/0253403 A1* 10/2008 Bondy ................ H04L 61/1588
370/485

FOREIGN PATENT DOCUMENTS

| GB | 2481716 | * | 1/2012 |
|---|---|---|---|
| GB | 2481716 A | | 1/2012 |
| WO | 2008122641 A2 | | 10/2008 |

OTHER PUBLICATIONS

International Search Report dated Aug. 17, 2017 for corresponding International Application No. PCT/FR2017/051739, filed Jun. 29, 2017.

(Continued)

*Primary Examiner* — Kim T Nguyen
(74) *Attorney, Agent, or Firm* — David D. Brush; Westman, Champlin & Koehler, P.A.

(57) ABSTRACT

A synchronisation method implemented, in a mobile network, by a first device hosting a network function used for the connection of a mobile terminal to the mobile network. The mobile network includes second devices hosting the network function. The method includes the following steps: establishing a connection with a mobile terminal in order to execute, as the main device, the network function in association with the mobile terminal; determining context data associated with the mobile terminal; recording context data in a memory associated with the first device; and sending context data to secondary devices, from among the second devices of the mobile network, so as to synchronise the context data recorded by the first device and the secondary devices.

17 Claims, 6 Drawing Sheets

(51) Int. Cl.
  *G06F 11/00* (2006.01)
  *H04M 7/00* (2006.01)
(52) U.S. Cl.
  CPC ......... *H04M 7/00* (2013.01); *H04W 36/0033* (2013.01); *H04M 2203/554* (2013.01); *H04M 2242/40* (2013.01); *H04M 2242/405* (2013.01)
(58) Field of Classification Search
  CPC ..... H04M 2203/554; H04M 2242/405; H04W 36/0033
  See application file for complete search history.

(56) References Cited

OTHER PUBLICATIONS

Machine translation—Written Opinion of the International Searching Authority dated Aug. 17, 2017 for corresponding International Application No. PCT/FR2017/051739, filed Jun. 29, 2017.
English Translation of the Written Opinion of the International Searching Authority dated Aug. 25, 2017 for corresponding International Application No. PCT/FR2017/051739, filed Jun. 29, 2017.

\* cited by examiner

METHOD FOR SYNCHRONIZING CONTEXT DATA OF NETWORK FUNCTIONS IN A MOBILE NETWORK

CROSS-REFERENCE TO RELATED APPLICATIONS

This Application is a Section 371 National Stage Application of International Application No. PCT/FR2017/051739, filed Jun. 29, 2017, which is incorporated by reference in its entirety and published as WO 2018/002531 A1 on Jan. 4, 2018, not in English.

BACKGROUND OF THE INVENTION

The present invention lies in the field of telecommunications networks and pertains in particular to the management of network functions executable in a mobile network.

It relates more particularly to the management of data processed by such network functions in a mobile network, such as a mobile telephone network or a Wifi network for example. A "network function" within the meaning of the present patent application is defined in particular in ETSI standard NFV 003 v1.2.1 as being a functional block, in a network infrastructure, which exhibits well-defined external interfaces and a well-defined functional behavior.

Such network functions are thus implemented by the operator of a network in order to provide the clients thereof with connectivity and their purpose is therefore to allow the connection of the terminals to this network. To this effect, each network function exhibits at least one interface to another network function, so that any connection of a mobile terminal with the network implements at least two network functions interfaced together in such a way as to be able to dialog. In the case of a mobile network separated into a radio access network, on the one hand, and a network core, on the other hand, such network functions within the framework of the present invention are hosted within the network core, on equipment not forming part of the radio access network.

Within the framework of future mobile telephone networks, of the 5G type and beyond, a trend is emerging to distribute the network functions of the network core as close as possible to the users (these network functions still forming part of the network core but no longer being centralized as they are currently), so as to improve the reactivated of the networks in the execution of the functions. These network functions will moreover be split up into multiple network sub-functions, and can be implemented either in the form of network functions implemented by physical equipment dedicated to them or in the form of virtualized network functions instantiated on standard physical equipment. To serve a mobile terminal in a mobile network, each network function (or sub-function) needs to retrieve context data (profile data, temporary data . . . ) specific to the mobile terminal. A network function can thus execute by taking the context data of the mobile terminal as input. Such network functions pertain for example to the management of mobility of a mobile telephone terminal ("handover" in the 3GPP specifications) or to the updating of the location of a user of such a terminal ("location update" in the 3GPP specifications) or to the management of the sessions of such a terminal ("session management" in the 3GPP specifications)

Another trend which is emerging today is to implement so-called "stateless" network functions, that is to say network functions separated from the context data of the associated mobile terminal. In other words, the context data of a mobile terminal are not stored permanently in the memory space of a network function but in an independent memory space, situated on one and the same site as the network function, contrary for example to the current organization of 4G networks. This separation makes it possible in particular to offer better resilience of the network. If a given network function poses a problem, another equivalent function can take over and access the requested context data more easily.

However, distributing such stateless network functions in the core of a mobile network presents certain difficulties as regards in particular the constraints that the network must satisfy. In particular, the mobile network must be capable of providing the context data to the network functions with a low latency. When a network function is invoked subsequent to an event in the network, it is desirable that the requested context data be available rapidly so as not to slow down the execution of said function.

Currently, when a mobile terminal registers with a site (or node) of an operator in a 4G network, the context data specific to the terminal in the 4G network are not necessarily available locally at the level of the site considered. In a known manner, this site can then retrieve, during its exchanges with the mobile terminal, the identifier of another network function which has previously executed for the mobile terminal. The site concerned can thus retrieve the context data of the terminal from another site in which the network function thus identified is implemented. However, this approach does not enable the above-mentioned latency requirements to be addressed in a satisfactory manner.

Patent application GB 2 481 716 describes a mobile network in which application data of a mobile terminal can be saved locally at the level of the access points of the access network of this mobile network. However, these saved backup application data are not context data taken as input of network functions hosted within the core network of this mobile network, which is otherwise absolutely not impacted by these purely local backup saves.

The present invention proposes to address in particular the problem described hereinabove and is aimed, in a general manner, at improving a network function's access to an item of data which it needs in order to execute in a mobile network.

SUBJECT AND SUMMARY OF THE INVENTION

To this effect, the present invention proposes a method of synchronization implemented, in a mobile network, by a first device hosting a network function serving for the connection of a mobile terminal to the mobile network, said mobile network comprising at least one second device hosting said network function, the method comprising the following steps:

establishment of a connection with a mobile terminal so as to execute, as main device, the network function in association with said mobile terminal;

determination of context data associated with the mobile terminal, said context data being data taken as input by the network function in order to execute;

recording of the context data in a memory associated with said first device; and dispatching of the context data to at least one second device, termed secondary device, hosting said network function in said mobile network so as to synchronize the context data recorded by the first device and said at least one secondary device.

The invention enables the context data, of a mobile terminal, to be kept up-to-date at the level of the secondary devices of the mobile network. The secondary devices can thus record in their associated memory the context data received. In this way, the network function, if it is invoked at the level of one of these secondary devices, can rapidly retrieve the context data necessary for its execution, thereby making it possible to substantially improve the reactivity of the mobile network.

According to a particular embodiment, during the dispatching step, the first device dispatches only modifications detected in said context data with respect to former context data, of said mobile terminal, which are recorded locally before said step of determining the context data.

In this way, it is possible to limit the amount of context data transmitted by the main device in order to synchronize its secondary devices, therefore economizing on the traffic and the resources required in the mobile network.

According to a particular embodiment, the mobile network comprises a plurality of second devices hosting said network function, and, during the dispatching step, the first device dispatches the context data only to a selection of at least one secondary device from among the plurality of second devices of the mobile network so that at least one unselected second device is not synchronized with the first device.

By limiting the devices kept synchronized in the mobile network, it is advantageously possible to economize on the network resources and the traffic which are necessary in the mobile network in order to implement such a synchronization. As indicated subsequently, for example only neighbor sites of a main site are synchronized so as to synchronize only the secondary sites which are most liable to serve (i.e. to execute a network function for) the mobile terminal subsequently.

According to a particular embodiment, the method furthermore comprises a step of obtaining, by the first device, a list identifying at least one neighbor second device of the first device in the topology of the mobile network, the selection of at least one secondary device consisting of this at least one neighbor second device identified in said list, thus making it possible to limit the synchronization of the context data to just the sites having the highest probability of serving the mobile terminal when it is moving.

According to a particular embodiment, the selection of at least one secondary device to which the context data are dispatched during the dispatching step is recorded in a local memory of the (or associated with the) first device. The main device is thus able to easily determine the device or devices of the mobile network that it must deal with as secondary devices.

According to a particular embodiment, the method comprises the reception of an identifier of a single secondary device in the mobile network, in which the selection of at least one secondary device, to which the context data are dispatched during the dispatching step, comprises only said single secondary device. In this way, it is possible to yet further limit the network resources necessary to keep to synchronize the context data and ensure good reactivity of the network.

According to a particular embodiment, the method comprises the following steps:
  detection of at least one unselected second device, termed obsolete device, to which the context data are not dispatched during the dispatching step and holding in an associated memory of the obsolete context data of the mobile terminal; and
  dispatching of a deletion command to said at least one obsolete device so as to cause the deletion of the obsolete context data.

The dispatching of such a deletion command advantageously makes it possible to prevent context data which are no longer up-to-date (obsolete) from being retained in memory by one or more devices of the mobile network. It is thus possible to guarantee good coherence of the context data in the mobile network.

According to a particular embodiment, the method comprises the reception of an identifier of a second device of the mobile network previously connected to said mobile terminal so as to execute, as main device in place of said first device, the network function in association with said mobile terminal;
  said at least one obsolete device being determined on the basis of said identifier.

The first device, acting as main device, can thus determine the second device or devices of the mobile network which are liable to hold obsolete context data in memory and thus ensure that these obsolete data are deleted so as to guarantee good coherence of the mobile network.

According to a particular embodiment, the method comprises the dispatching of an identifier of the first device to a central device of the mobile network so as to store in a centralized manner in the mobile network the identity of the first device as main device. In this way, a second device, subsequently acting as main device in place of the first device, will be able to determine the device having previously acted as main device and deduce therefrom in particular the device or devices of the mobile network to which a deletion command must be dispatched.

According to a particular embodiment, the method comprises, after the step of dispatching the context data, the following steps:
  reception of an updating request originating from a second device of the mobile network to which the context data have not been dispatched during the dispatching step; and
  dispatching of the context data in response to said updating request.

In this way, when a second device which has not been synchronized becomes main device subsequently, it is capable of retrieving the up-to-date context data from the first device.

According to a particular embodiment, the step of determining context data associated with the mobile terminal comprises, after the step of establishing a connection with a mobile terminal:
  detection that no context datum, associated with the mobile terminal, is contained in the memory associated with said first device;
  retrieval, from a centralized device of the mobile network, of an identifier of a second device of the mobile network previously connected to said mobile terminal so as to execute, as main device in place of said first device, the network function in association with said mobile terminal; and
  dispatching of a synchronization request to the second device corresponding to said identifier so as to retrieve context data recorded by the second device.

In this way, when a device of the mobile network becomes main device and detects that it does not have any context data in its memory for the mobile terminal, it is capable of easily retrieving the up-to-date context data so as to execute the network function.

In a particular embodiment, the various steps of the synchronization method are determined by instructions of computer programs.

Consequently, the invention also envisages a computer program on an information medium, this program being liable to be implemented in a device or in a computer, this program comprising instructions suitable for the implementation of the steps of a synchronization method such as is defined hereinabove.

This program can use any programming language, and be in the form of source code, object code, or of code intermediate between source code and object code, such as in a partially compiled form, or in any other desirable form.

The invention also envisages an information medium (or recording medium) readable by a computer, and comprising instructions of a computer program such as is mentioned hereinabove.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can be in particular downloaded over a network of Internet type.

Alternatively, the information medium can be an integrated circuit in which the program is incorporated, the circuit being adapted to execute or to be used in the execution of the method in question.

The invention also relates to a device hosting a network function in a mobile network, said mobile network comprising at least one second device hosting said network function, said network function serving for the connection of a mobile terminal to the mobile network, the device comprising:
- a connection establishment module for establishing a connection with a mobile terminal so that said device executes, as main device, the network function in association with said mobile terminal;
- a determination module for determining context data associated with the mobile terminal, said context data being data taken as input by the network function in order to execute;
- a recording module for recording context data in a memory associated with said first device; and
- a dispatching module for dispatching the context data to at least one second device, termed secondary device, hosting said network function in said mobile network so as to synchronize the context data recorded by said device and said at least one secondary device.

According to one embodiment, the invention is implemented by means of software components and/or hardware components. In this regard, the term "module" can correspond in this document either to a software component, or to a hardware component or to a set of hardware components and software components.

It will be noted that the various embodiments mentioned hereinabove in conjunction with the synchronization method of the invention as well as the associated advantages apply in an analogous manner to the device of the invention.

Thus, according to a particular embodiment, the mobile network comprises a plurality of second devices hosting said network function, the dispatching module being configured to dispatch the context data only to a selection of at least one secondary device from among the plurality of second devices of the mobile network so that at least one unselected second device is not synchronized with the first device.

According to a particular embodiment, the selection of at least one secondary device, to which the dispatching module is configured to dispatch the context data, is recorded in a local memory of the first electronic device.

BRIEF DESCRIPTION OF THE FIGURES

Other characteristics and advantages of the invention will become apparent on reading the description which follows, given with reference to the appended drawings in which.

DETAILED DESCRIPTION OF EMBODIMENTS

As already indicated, the invention relates to the access of a network function to certain data in a mobile network, and more particularly, access to context data associated with a mobile terminal so as to allow said function to execute.

In the present disclosure, by "context data" is meant data specific to a mobile terminal and which are taken as input by a network function intended to be executed for (in association with) the mobile terminal, for example to carry out a given procedure in response to an event in the network. The context data to be retrieved by a network function in order to execute can comprise static data, such as profile data of the user of the mobile terminal considered, and/or dynamic data allotted to the mobile terminal (or to its user) in order to register with and interact with the mobile network.

These context data are therefore data used for the execution of network functions serving for the connection of the mobile terminal to the mobile network. In this respect, they are distinguished from simple application data which serve mainly for the operation of an application launched on a mobile terminal connected to the mobile network. Such context data are therefore not necessarily visible to the user of the terminal or the applications running on this terminal.

These dynamic data can comprise, for example, at least one from among state data representative of the state (connected/unconnected, currently in use . . . ) of the mobile terminal in relation to the mobile network, a temporary identifier allotted to the mobile terminal, data representative of the location of the mobile terminal, data characterizing the traffic of the mobile terminal in the network, and one or more addresses of access points for the mobile network. The notion of context data being well known to the person skilled in the art, it will not be further described here.

In this document, nonlimiting embodiments of the invention are described within the framework of network functions implemented in a telephone mobile network, of 5G type for example. As is understood by the person skilled in the art, the invention applies more generally to all types of mobile network, in particular to telephone networks and Wifi networks.

Except where indicated to the contrary, the elements which are common or analogous to several figures bear the same reference signs and exhibit identical or analogous characteristics, so that, for the sake of simplicity, these common elements are generally not described again.

Figure 1:
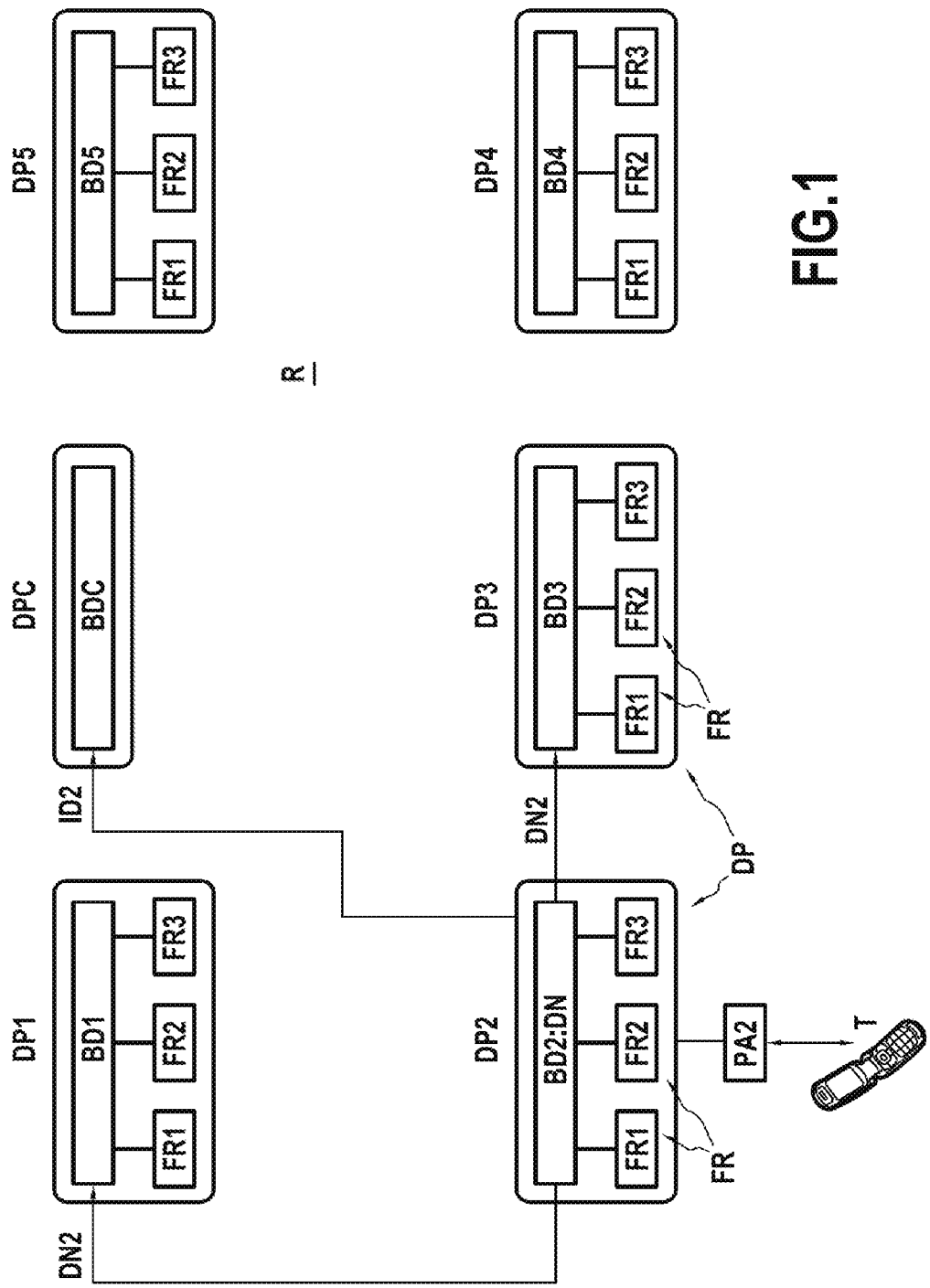
FIG. 1 represents the structure of a mobile network comprising devices and a central device, according to a particular embodiment of the invention.

FIG. 1 represents a mobile telephone network R comprising devices (or systems) DP1 to DP5, collectively denoted DP, and a central device (or system) DPC. In this example, each device DP forms a node of the mobile network R and is situated on a distinct site managed by the operator of the network R. Such a site takes for example the form of a set of equipment making it possible to manage the access of a mobile terminal T to services of the mobile network R.

The notion of site in the field of mobile communication networks is well known and will not be described in greater detail here. However, it is appropriate to recall that a mobile communication network can be separated into two parts, namely on the one hand a radio access network comprising base stations (for example eNodeB for a $4^{th}$ generation mobile network), possibly associated with radio access controllers, allowing the mobile terminals to communicate with the network by radio and on the other hand a network core comprising a certain number of nodes managing, in particular, access to the network, or to external networks through it. The above-mentioned devices DP thus form part of the network core, and not of the access network of the mobile network R.

According to a particular example, the devices DP take the form of a server or, alternatively, the form of a local network comprising a plurality of servers (or more generally equipment for the management of network functions FR of the network R).

In this example, each device DP of the network R exhibits an identical structure and operates in an identical manner, although other embodiments are possible. It is assumed here that each device DP is configured to be able to execute 3 network functions FR1 to FR3 in association with a mobile terminal such as the terminal T in this example. The network functions FR1-FR3 are therefore here distributed in the mobile network R so as to be executed as close as possible to the mobile terminal T of the user, as explained subsequently. As already explained, this distribution allows, in particular, great reactivity of execution of the network functions in the mobile network R.

In this example, the devices DP all implement the same network functions FR1-FR3. It is however possible to envisage that the network functions FR differ at least in part from one device DP to another.

Each device DP1 to DP5 furthermore comprises a respective database (or memory) BD1 to BD5 configured to store in memory data required to execute the network functions FR1 to FR3, and more particularly, to store context data DN associated with the mobile terminal T.

To serve the mobile terminal T in the network R, each network function FR must retrieve context data as previously defined (profile data, temporary data . . . ) associated with the mobile terminal T. The network functions FR can thus execute, in the network core of the mobile network R, by taking the context data of the mobile terminal T as input. The network functions FR, serving for the connection of the mobile terminal T to the mobile network R, pertain for example to the management of mobility of the mobile terminal T, to the location of a user of said terminal T or else to the management of the sessions of the mobile terminal T. The person skilled in the art will know how to adapt the network functions according to the needs of each particular case.

Moreover, it is assumed in this example that the network functions FR are "stateless" network functions as previously defined, namely, in this example, network functions separated from the context data of the mobile terminal T. The context data of the mobile terminal T are not stored permanently in a memory space of the network functions FR but in the independent memory DB1-DB5 associated with the respective device DP1-DP5. In the example envisaged here, the databases DB1-DB5 are disposed locally in the corresponding device DP1-DP5. As a variant, the databases DB1-DB5 may be arranged outside of the corresponding device DP1-DP5 but in a local network associated with said corresponding device DP1-DP5. The storage of context data in a memory space distinct from the memory space of the network functions FR makes it possible in particular to offer better resilience of the network R, as already indicated. If a given network function FR poses a problem, another equivalent function FR can take over and access the requested context data more easily.

Moreover, in the example considered here, the databases DB1-DB5 are shared in each device DP between the network functions FR1-FR3. Other implementations with dedicated memories are possible.

Moreover, in the example represented in FIG. 1, each device DP1-DP5 is dedicated, within the network core of the mobile network R, to a given geographical area. When the mobile terminal T is situated in a given geographical area, it registers with the mobile network R (network attachment procedure), and then it is the device DP associated with the geographical area in which the mobile terminal T is situated which takes charge of said terminal T in order to execute the network function or functions FR.

In this example, the mobile terminal T is a mobile telephony terminal, such as a mobile telephone for example.

Moreover, the central device DPC comprises a central database (or memory) BDC configured to store data useful to the mobile network R, in particular profile data (or subscription data) of the user of the mobile terminal T. Each device DP is configured here to communicate via the network R with the central device DPC of the operator.

It will be understood that certain elements generally present in a mobile communication network have been intentionally omitted since they are not necessary for the understanding of the present invention. It will also be understood that the devices DP represented in FIG. 1 constitute only an exemplary embodiment, other implementations being possible within the framework of the invention.

The structure of the device DP2 is now described with reference to FIGS. 1 and 2, in accordance with a particular embodiment of the invention. It is assumed in this example that the structures of the other devices DP are identical to that of the device DP2, so that for the sake of simplicity they will not be described here.

More specifically, the device DP2 comprises in this example at least one processor (not represented) driven by a computer program PG, so as to implement modules MD2 to MD10, namely: a connection establishment module MD2, a determination module MD4, a recording module MD6, a dispatching module MD8 and a synchronization module MD10.

In this example, the computer program PG is stored in a nonvolatile memory MR1 of the device DP2, this memory constituting a recording medium in accordance with a particular embodiment, readable by the device DP2. The computer program PG furthermore comprises instructions for the execution of the steps of a synchronization method according to various particular embodiments described subsequently.

More specifically, the connection establishment module MD2 is configured to establish a connection with the mobile terminal T so that said device DP2, as main device, executes a network function FR in association with said terminal T. To establish such a connection, the device DP2 and the terminal T communicate together so that the device DP2 recognizes the terminal T (registration of the terminal T).

It is assumed here for example that the terminal T connects to the network R via an access point PA2. Once the terminal T has been recognized by the device DP2, the latter is configured to execute for example the network function FR1 in association with the terminal T.

The determination module MD4 is configured to determine context data DN2 associated with the mobile terminal T, these context data DN2 being data taken as input by the network function FR1 in order to execute.

The recording module MD6 is configured to record the context data DN2, obtained by the determination module MD4, in the associated database DB2.

The dispatching module MD8 is configured to dispatch the context data DN2 to at least one other second device DP (here DP1, DP3, DP4 and/or DP5), termed secondary device, hosting the network function FR1 in the mobile network R so as to synchronize the context data DN2 recorded by the device DP2 and said at least one secondary device.

The operation of the modules MD2-MD10 of each device DP will be more specifically apparent in the exemplary embodiments described hereinafter. It will be understood that the modules MD2-MD10 such as represented in FIG. 2 represents only an exemplary nonlimiting implementation of the invention.

The distribution of the stateless network functions FR (here more particularly of the function FR1) in the mobile network R presents a difficulty owing to the fact that, in order to execute, a network function FR must firstly retrieve the context data of the terminal T that said function takes as input. In order to limit the latency times of the mobile network R, and thus improve its reactivity, the invention proposes to configure the devices DP so that they synchronize with one another. In this way, the up-to-date context data of the mobile terminal T are rapidly accessible by each function FR in the devices DP.

Figure 3:
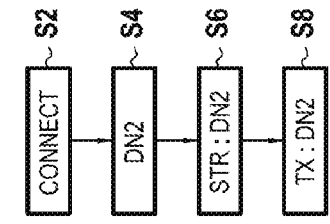
FIG. 3 represents, in the form of a chart, the steps of a synchronization method, according to a particular embodiment of the invention.
Figure 2:
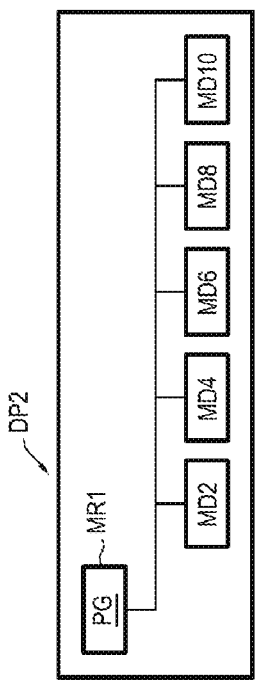
FIG. 2 schematically represents the structure of a device of the mobile network such as illustrated in FIG. 1.

The steps of a synchronization method implemented by the device DP2 in the mobile network R, as represented in FIGS. 1 and 2, are now described with reference to FIG. 3. It is assumed in this example that the mobile terminal T is situated in the geographical area of the device DP2, the latter then having to act as main device in order to execute the network function FR1 in association with said terminal T. More particularly, this exemplary synchronization method, implemented by the device DP2, comprises the following steps:

establishment (step S2) of a connection with the mobile terminal T in order to execute, as main device, the network function FR1 in association with the mobile terminal T;

determination (step S4) of context data DN2 associated with the mobile terminal T, these context data DN2 being data taken as input (i.e. input data) by the network function FR1 in order to execute;

recording (step S6) of the context data DN2 in the associated memory BD2 of the device DP2; and dispatching (step S8) of the context data DN2 to at least one other device DP, termed secondary device, hosting the network function FR1 in the mobile network R so as to synchronize the context data DN2 recorded by the device DP2 and this(these) secondary device(s).

By virtue of the invention, devices DP (acting as secondary devices) other than the device DP1 (acting as main device) receive the up-to-date context data DN2 of the mobile terminal T. These secondary devices DP are configured to record in their respective database the context data DN2 received. In this way, the secondary devices DP are kept synchronized by the main device DP2.

The device DP2, acting as main device, can dispatch during step S8 the context data to all the other devices DP of the mobile network R or, alternatively, to only some among the other devices DP1, DP3, DP4 and DP5 of the mobile network R. More particularly, it has been observed that it may be difficult to maintain coherence in the mobile network in particular when the size of the network is significant and when the network function concerned is distributed in a significant manner in the network. Owing to the large number of sites in a very distributed network (for example in an operator network containing hundreds of sites), it can become difficult to ensure the synchronization of the context data of a mobile terminal in case of synchronization of all the distributed sites.

According to a particular embodiment, the invention consequently proposes to adapt the principle described hereinabove so that only certain sites from among a plurality of sites of the mobile network are synchronized. By limiting the sites kept synchronized in the mobile network, it is advantageously possible to economize on the network resources and the traffic which are necessary in the mobile network in order to implement such a synchronization. As indicated subsequently, for example only neighbor sites of a main site are synchronized so as to synchronize only the secondary sites which are most liable to serve (i.e. to execute a network function FR for) the mobile terminal T subsequently.

A particular embodiment is now described with reference to FIGS. 1, 2 and 4. More specifically, the device DP2 represented in FIGS. 1 and 2 implements a synchronization method by executing the computer program PG.

It is assumed again that the mobile terminal T is situated in the geographical area of the device DP2, the latter then acting as main device in order to execute the network function FR1 in association with said terminal T.

In the course of a connection step B2 (identical to step S2 illustrated in FIG. 3), the device DP2 establishes a connection with the mobile terminal T in order to execute, as main device, the network function FR1 that it hosts in association with said mobile terminal T. The establishment of the connection can take any appropriate form, such as an exchange of data so that the device DP2 recognizes the terminal T and is enabled to execute the network function FR1 in association with the terminal T.

In a particular example, it is assumed that the device DP2 already has at its disposal context data associated with the terminal T in its database BD2, these context data being input data required in order to execute the network function FR1. These context data have for example been previously obtained and recorded by the device DP2, acting as secondary device, according to the principle of the synchronization method described hereinafter. It is furthermore assumed that the device DP2 executes (or has executed) the network function FR1 in association with the terminal T.

In the course of a determination step B4 (identical to step S4 illustrated in FIG. 3), the device DP2 subsequently determines new context data (denoted DN2) of the mobile terminal T, these data DN2 being input data required in order to execute the network function FR1.

The device DP2 then records (step B6) these context data DN2 in its database BD2, as already described with reference to step S6 illustrated in FIG. 3.

In the course of a dispatching step B8, the device DP2 dispatches the context data DN2, determined during step B4, only to a selection of at least one secondary device from among the plurality of the devices DP other than the main device DP1, so that at least one unselected device DP (i.e. not forming part of this selection) is not synchronized with the main device DP2. In other words, the device DP2, acting as main device, does not dispatch the context data DN2 during step B8 to at least one from among the devices DP1, DP3, DP4 and DP5.

As illustrated in FIG. 1, it is assumed here that the device DP2, acting as main device, dispatches during step B8 the context data DN2 to the devices DP1 and DP3 but not to the devices DP4 and DP5. Consequently, only the devices DP1 and DP3 from among the devices DP other than the device DP2 are secondary devices within the meaning of the invention.

In the example described here, the secondary devices DP1 and DP3 selected by the main device DP2 are neighbor devices, that is to say devices situated in geographical proximity to the device DP2 (for example at a distance of less than or equal to a predefined maximum distance). In an advantageous manner, only the devices (and sites) which neighbor the main device DP2 are kept synchronized with the main device DP2 thereby making it possible to limit the necessary network resources (traffic, equipment . . . ) while guaranteeing reduced latency of the mobile network R. Indeed, when the mobile terminal T is moving, the secondary devices DP1 and DP3 are the devices most liable to subsequently become main device so as to serve the mobile terminal T in their turn.

In a particular example, the device DP2, acting as main device, determines the secondary devices DP, to which the context data DN2 must be dispatched during step B8, on the basis of a predefined list (or selection) identifying these secondary devices DP, this list being for example recorded in a local or associated memory of the device DP2 (in the database DB2 for example) subsequent to its being obtained by the device DP2.

Thus, in a particular example, for each device DP, a list of the neighbor devices in the topology of the network R can be transmitted to it beforehand by a central device (not represented) having an overall picture of the topology of this network, this list then being able to be updated automatically when this topology is modified (for example when the operator turns off or shuts down certain sites at night). Alternatively, the device DP2 can, during the determination of the secondary devices DP to which to dispatch the data DN2, transmit an interrogation request (for example of DNS type) to a server of the network R (in particular a DNS server), storing for each device DP a list of the neighbor devices to which to dispatch the data DN2, that it can return to it in a response message in reply to this request. This avoids, for the operator of the network R, a systematic updating of the whole set of devices or sites of this network R as soon as the topology of the network changes, and therefore makes it possible to optimize the signaling load on the network.

The secondary devices DP1 and DP3 receive the context data DN2 respectively during steps A8 and C8. The secondary devices DP1 and DP3 thereafter synchronize with one another respectively during steps A10 and C10, on the basis of the context data DN2 received. More particularly, the secondary devices DP1 and DP3 record the context data DN2 received during steps A8 and C8 so as to update their database BD1 and BD3.

According to a particular example, the device DP2, acting as main device, also dispatches (step B12) an identifier ID2 of said device DP2 to the central device DPC. The central device DPC receives the identifier ID2 of the device DP2 (step E12) and then records it in its central database BDC (step E14). As explained later, this recording E14 subsequently allows the central device DPC to indicate to a device DP, other than the main device and secondary devices DP1-DP3, the identity of the current main device (DP2).

According to a particular example, the device DP2, acting as main device, does not dispatch during step B8 all the context data DN2 which it has at its disposal to the secondary devices DP1, DP3, but only modifications detected in the context data DN2 with respect to former context data, of the terminal T, recorded in the database BD2 before steps B4-B6 (in other words, the device DP2 dispatches only the modifications made to the context data DN2 with respect to a previous update). In this way, it is possible to limit the amount of data transmitted by the main device in order to synchronize its secondary devices, therefore economizing on the traffic and the resources required in the network R.

A particular embodiment is now described with reference to FIGS. 5 and 6. More specifically, the device DP3, exhibiting an identical structure to that of the device DP2, implements a synchronization method by executing the computer program PG.

Figure 4:
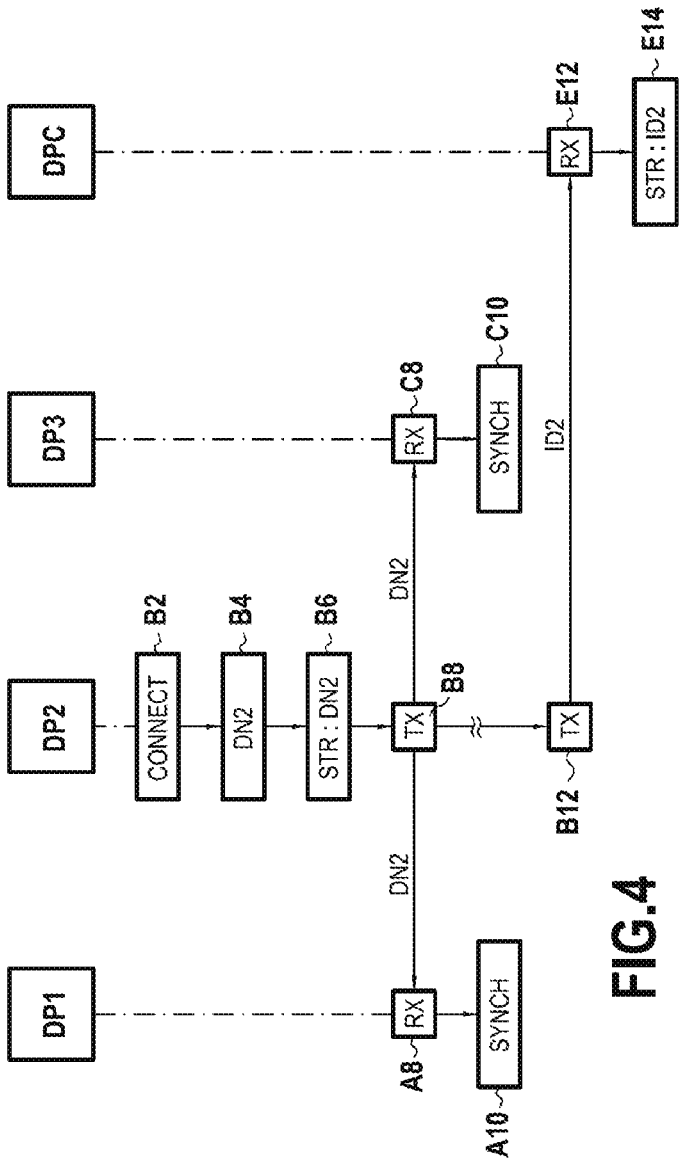
FIG. 4 represents, in the form of a chart, the steps of a synchronization method, according to a particular embodiment of the invention.

Here, the state of the mobile network R on completion of the synchronization method described hereinabove with reference to FIG. 4 is considered to be the initial state.

It is now assumed that the mobile terminal T moves and enters the neighborhood (the geographical area) of the device DP3. The mobile terminal T then connects to the network R via an access point PA3 and registers with the network.

In the course of a connection step C30 (analogous to step B2 illustrated in FIG. 3), the device DP3 establishes a connection with the mobile terminal T in order to execute, as new main device, the network function FR1 that it hosts in association with said mobile terminal T. Accordingly, the device DP3 exchanges for example data with the terminal T so that the latter is recognized and that the network function FR1 can be executed.

It is understood here that the device DP2 is no longer main device insofar as it is no longer best placed to execute the network function FR1 on behalf of the terminal T.

During a step C31, the device DP3 determines (or retrieves) the context data DN2 previously recorded in its database BD3 during step C10. The device DP3, acting as main device, thereafter executes (step C32) the network function FR1 on the basis of the context data DN2 taken as input data.

The invention thus advantageously makes it possible to significantly increase the reactivity of the mobile network R in order to execute the network function FR1 when the mobile terminal T is in motion. Moreover, as already indicated, the cost of this synchronization in terms of resources of the network R is limited owing to the fact that only the neighbor devices DP of the main device are updated by the latter.

Figure 5:
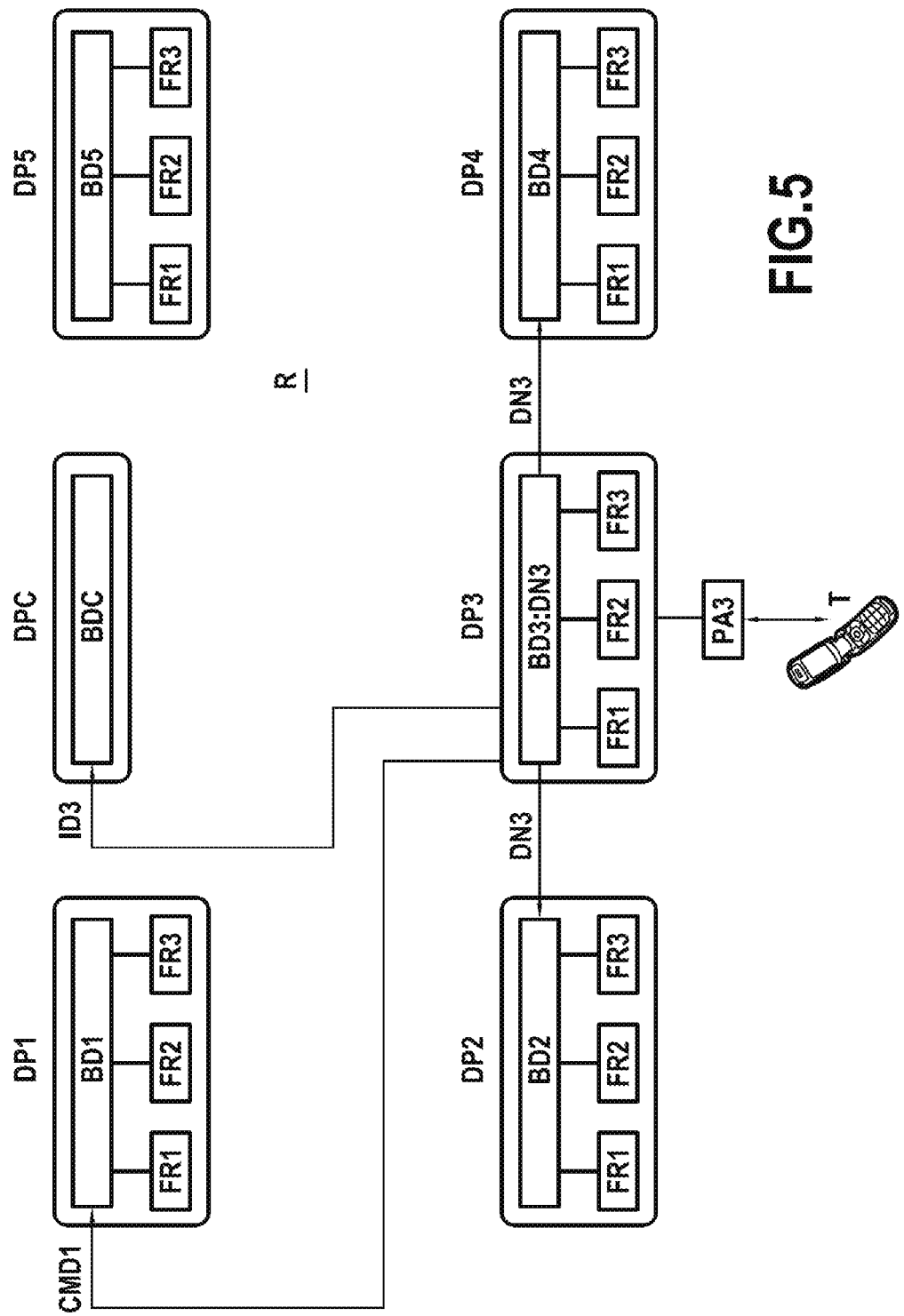
FIGS. 5 and 6 represents a particular embodiment of the invention.
Figure 6:
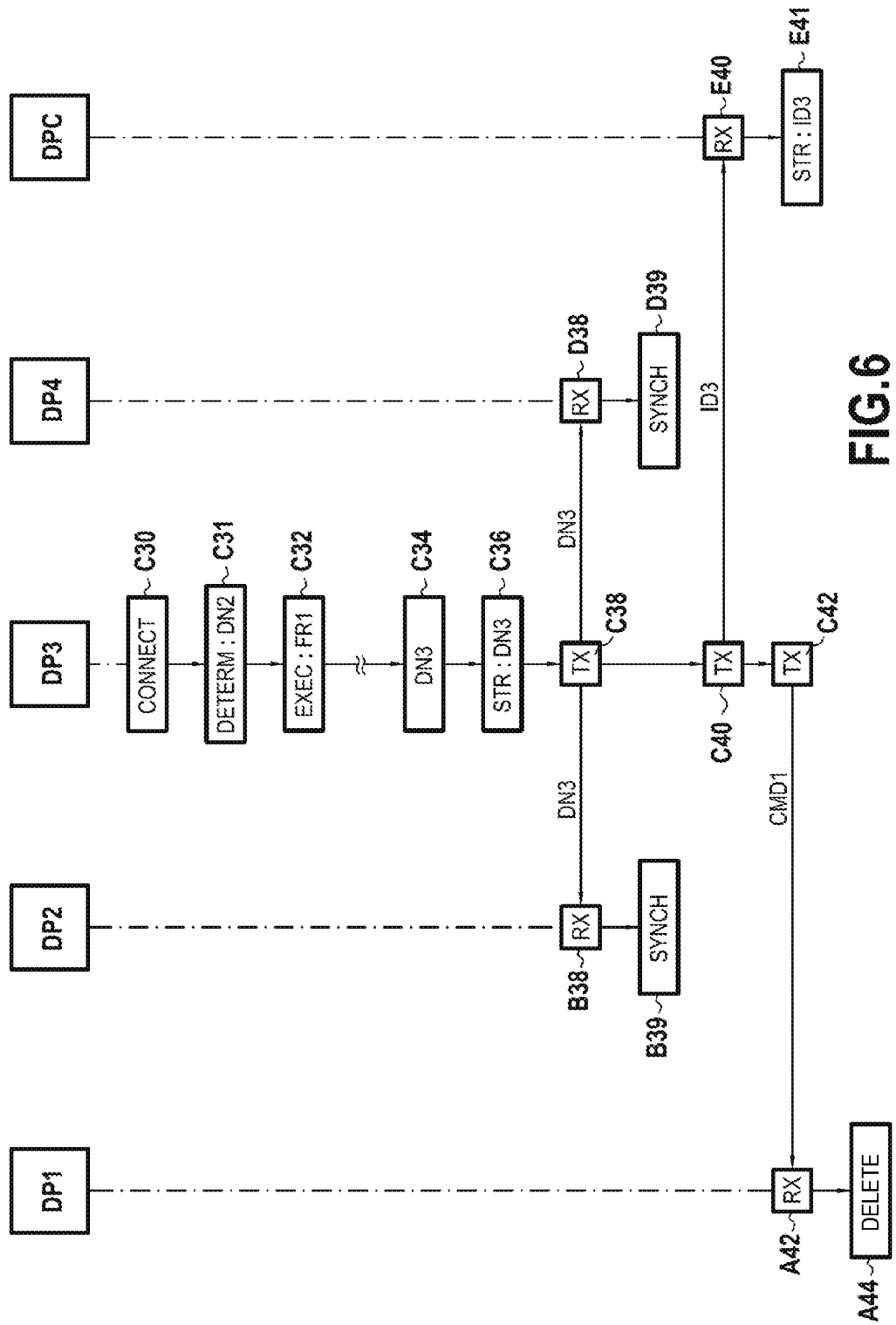

Still with reference to FIGS. 5 and 6, it is thereafter assumed in this example that the device DP3 acts (steps C34-C38) as main device in the same way as the device DP2 during steps B4-B8 represented in FIG. 4. More particularly, it is assumed that the device DP3 determines (step C34) new context data DN3 associated with the mobile terminal T. The device DP3 can indeed regularly enrich or modify the context data DN3 of the terminal T. The device DP3 thereafter records (step C36) these new context data DN3 in its database BD3. The device DP3, acting as main device, dispatches (step C38) the new context data DN3 to a selection from among the devices DP of the mobile network R, namely to the neighbor devices DP2 and DP4 in this example. The secondary devices DP2, DP4 receive the context data DN3 (respective steps B38, D38) and thereafter synchronize with one another (respective steps B39, D39), on the basis of the context data DN3 received. More particularly, the secondary devices DP2, DP4 record the context data DN3 received during steps B38, D38 so as to update their database BD2, BD4.

According to a particular example, the device DP3, acting as main device, furthermore advantageously dispatches (step C40) its identifier ID3 to the central device DPC. The central device DPC receives the identifier ID3 of the device DP3 (step E40) and then records it in its central database BDC (step E41). As explained subsequently, this recording E41 (in the same manner as the recording E14 in FIG. 4) subsequently allows the central device DPC to indicate to a device DP, other than the main device and secondary devices DP2-DP4, the identity of the current main device DP3.

According to a particular example, the device DP3, acting as main device, furthermore dispatches (step C42) a deletion command CMD1 to each device DP of the mobile network R (namely DP1 in this example) which is no longer kept synchronized and which is liable to hold in memory obsolete context data of the terminal T. This deletion command causes the deletion of the obsolete context data recorded by the recipient device or devices, termed obsolete devices. As illustrated in FIGS. 5 and 6, the device DP1 (former secondary device) receives the deletion command CMD1 during a reception step A42. In response to this command CMD1, the device DP1 deletes (step A44) the context data DN2, previously received during step A8 (FIG. 4), from its database BD1.

The device DP3 identifies for example the obsolete device or devices DP, to which a deletion command CMD1 must be dispatched, on the basis of the context data DN2 that the device DP3 had previously recorded in its database BD3 (during step C10 in FIG. 4). Thus, in a particular example, the device DP3 identifies, as obsolete devices DP to which a deletion command CMD1 must be dispatched, the device or devices DP which were dealt with as secondary devices by the previous main device DP2 (during step B8 in FIG. 4) and which are no longer dealt with as secondary devices by the new main device DP3. The new main device DP3 can also dispatch such a deletion command to a previous main device DP if the latter is not dealt with as secondary device by the device DP3.

The identification of the obsolete device or devices is for example carried out on the basis of the context data DN2 received and recorded during steps E12, E14 (FIG. 4). Accordingly, the context data DN2 received during step E12 by the device DP3 contain for example an identifier which identifies the device DP2 as main device. On the basis of this identifier, the new main device DP3 is then capable of determining the obsolete devices DP to which a deletion command CMD1 has to be dispatched. This assumes that the device DP3 know the topology of the mobile network R and, more particularly, the secondary device or devices associated with each device DP acting as main device.

The dispatching of such a deletion command advantageously makes it possible to prevent context data which are no longer up-to-date (obsolete) from being retained in memory by one or more devices DP of the mobile network R. It is thus possible to guarantee good coherence of the context data in the mobile network R.

A particular embodiment is now described with reference to FIGS. 7 and 8. More specifically, the device DP5, exhibiting a structure identical to that of the device DP2, implements a synchronization method by executing the computer program PG.

Here, the state of the mobile network R on completion of the synchronization method described hereinabove with reference to FIGS. 5 and 6 is considered to be the initial state.

It is now assumed that the mobile terminal T moves and enters the neighborhood (the geographical area) of the device DP5. The mobile terminal T then connects to the network R via an access point PA5 and registers with the network R. In this example, the mobile terminal T has passed from the neighborhood of the device DP3 to the neighborhood of the device DP5 without being detected by the device DP4. This case can occur for example if the mobile terminal T is moving at high speed or if the mobile terminal T was in the standby state while it was moving.

In the course of a connection step F60 (analogous to steps B2 and C30 illustrated in FIGS. 4 and 6), the device DP5 establishes a connection with the mobile terminal T in order to execute, as new main device, the network function FR1 that it hosts in association with said mobile terminal T. Accordingly, the device DP5 exchanges for example data with the terminal T so that the latter is recognized and that the network function FR1 can be executed.

It is understood here that the device DP3 is no longer main device (as in FIG. 5) insofar as it is no longer best placed to execute the network function FR1 on behalf of the terminal T.

In the course of a determination step F62, the device DP5 searches for the context data of the terminal T in its database BD5. In this particular example, the device DP5 has not previously been synchronized (for example during step C38 illustrated in FIG. 6) by the device DP3 then acting as main device. In this case, the device DP5 detects (step F62) that no context datum, associated with the mobile terminal T, is contained in its associated memory BD5.

The device DP5 thereafter retrieves (steps F64-F66), from the centralized device DPC of the mobile network R, the identifier of the device DP which was previously connected to the mobile terminal T in order to execute, as main device in place of the device DP5, the network function FR1 in association with the mobile terminal T.

More specifically, the device DP5 dispatches (step F64) a request RQ1 to the central device DPC so as to ascertain the device DP which dealt, as previous main device, with the terminal T. The central device DPC receives the request RQ1 (step E64) and, in this example, returns (step E66) a message containing the identifier ID3 of the device DP3, that it had previously received (step E40 illustrated in FIG. 6).

The device DP5 thereafter dispatches (step F68) a synchronization request RQ2 to this former main device DP3 so as to retrieve the context data DN3 recorded by this device DP3 (during step C36 illustrated in FIG. 6). The device DP3 receives the synchronization request RQ2 (step C68) and, in response to the latter, dispatches (step C70) the context data DN3 to the device DP5 which receives them during step F70.

The device DP5 then synchronizes (step F72) with the device DP3. In other words, the device DP5 updates its database BD5 by recording therein the context data DN3 received during step F70. The device DP5 thereafter executes (step F74) the network function FR1 for the terminal T, this function FR1 taking as input data the context data DN3.

The device DP5 can thereafter deal with the associated secondary devices DP, as well as the possible obsolete devices (DP3 for example), in the same way as the devices DP2 and DP3 acting successively as main device.

It is thus possible to synchronize on demand a device DP in the mobile network R when the latter has not been kept synchronized and needs context data in order to execute a network function FR.

Figure 7:
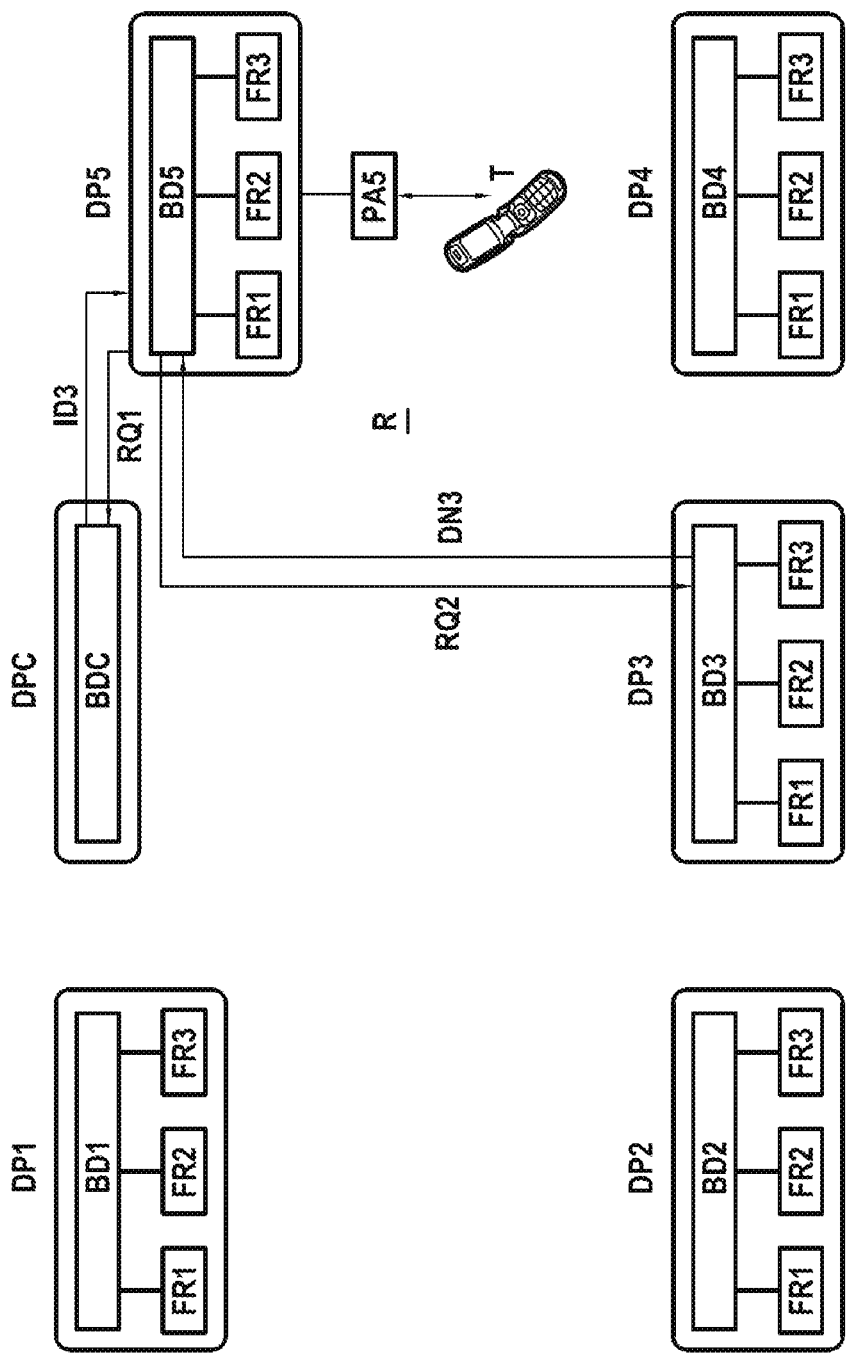
FIGS. 7 and 8 represents a particular embodiment of the invention.
Figure 8:
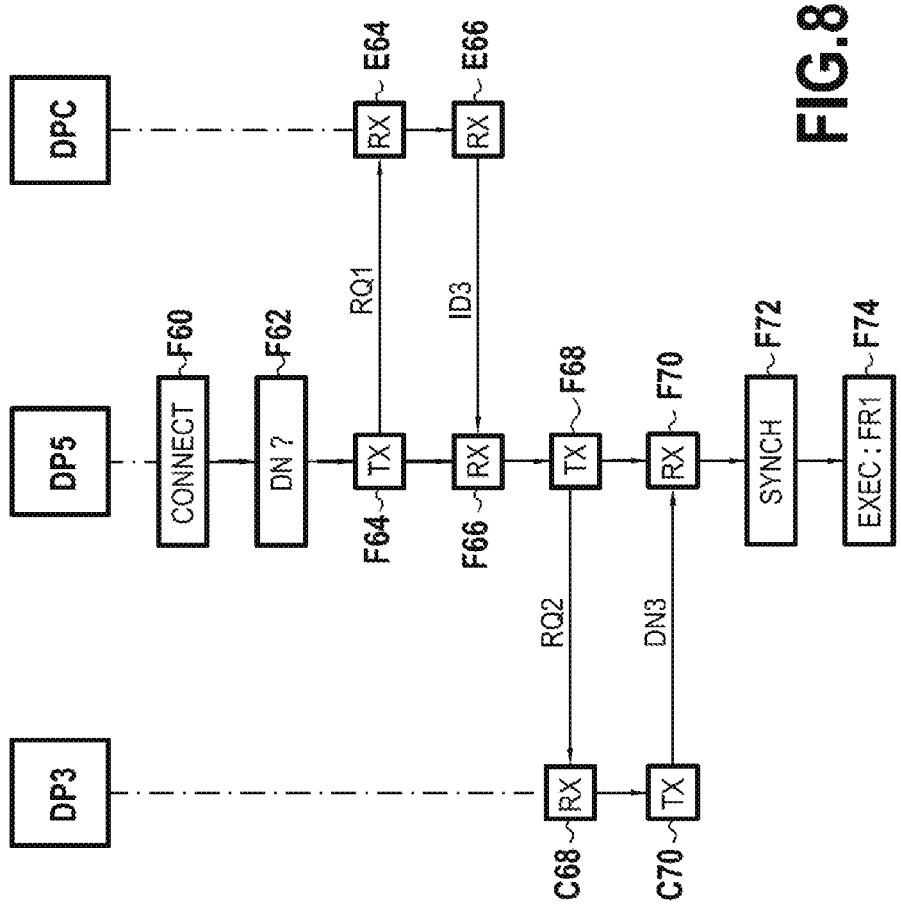

Note that, in the above embodiment represented in FIGS. 7 and 8, the new main device DP5 is capable of determining which was the previous main device (DP3) by virtue of the central device DPC which keeps this item of information in a centralized manner in the mobile network R. In certain cases, it is however possible that the central device DPC does not have this item of information at its disposal, such as for example when the terminal T registers with the mobile network R for the first time (first use). In this case, the central device DPC dispatches, during step E66, a message indicating that the identifier of the previous main device is not available. In a particular case, the central device DPC dispatches for example, to the device DP5, profile data (static subscription data) associated with the mobile terminal T. The device then determines, on the basis of these profile data received, the context data of the mobile terminal T (instead of executing steps F68-F72 as illustrated in FIG. 8).

In a particular embodiment, a network function FRLOC (not represented) is implemented in the mobile network R, for example by the central device DPC or by another entity of the network R. This function makes it possible, when it is executed, to estimate which will be the next device DP to act as main device, on the basis of a motion of the mobile terminal T. In this case, this function causes for example the dispatching, to the current main device (DP5 for example), of the identifier of the probable next main device. In response to this dispatching, the current main device (DP5) is then configured to dispatch its up-to-date context data solely to this probable next main device. This variant advantageously makes it possible to yet further limit the network resources necessary to perform the synchronization according to the invention while ensuring good reactivity of the mobile network R in order to execute the network function FR1.

In the embodiments and variants described hereinabove, the synchronization method of the invention is implemented in various devices DP of the mobile network, according to the case considered, in order to facilitate the understanding of the invention, in particular when the mobile terminal T moves. It will however be understood that each device DP of the mobile network R is configured to carry out the diverse steps described hereinabove in an analogous context. For example, the device DP2, acting as main device in the synchronization method represented in FIG. 4, can obtain, before step B2, up-to-date context data of another device DP then acting as main device, as described for example with reference to step C31 (FIG. 6). In a particular example, the device DP2, acting as main device in the synchronization method represented in FIG. 4, can cause the deletion of obsolete context data in a manner analogous to steps C40-C42 executed by the device DP3 in the embodiment illustrated in FIG. 6. In a particular example, the device DP2, acting as main device in the synchronization method represented in FIG. 4, can determine the context data of the terminal T in a manner analogous to steps F60-F72 executed by the device DP5 in the embodiment illustrated in FIG. 8.

A person skilled in the art will understand that the embodiments and variants described hereinabove merely constitute nonlimiting examples of implementation of the invention. In particular, the person skilled in the art will be able to envisage any adaptation or combination of the embodiments and variants described hereinabove in order to meet a very particular need.

The invention claimed is:

1. A method comprising:
synchronizing, implemented in a mobile network comprising a network core managing access to said mobile network, by a first device hosting in the network core a network function serving for connecting a mobile terminal to the mobile network, said mobile network comprising at least one second device hosting in the network core said network function, the synchronizing comprising the following acts:
establishing a connection is the mobile terminal to the first device so that said first device executes, as a main device, the network function in association with said mobile terminal;
determining context data associated with the mobile terminal, said context data being data taken as input by the network function in order to execute, in the network core of the mobile network, the network function for connecting the mobile terminal to the mobile network;
recording the context data in a memory associated with said first device; and
dispatching the context data to at least one of said at least one second device, wherein each second device to which the context is dispatched is termed a secondary device, so as to synchronize the context data in said first device and said at least one secondary device, said context data being accessible by said network function in each secondary device.

2. The method as claimed in claim 1, in which, during the dispatching, the first device dispatches only modifications detected in said context data with respect to former context data, of said mobile terminal, which are recorded locally before said determining the context data.

3. The method as claimed in claim 1, in which the mobile network comprises a plurality of second devices hosting said network function, and
in which, during the dispatching act, the first device dispatches the context data only to the at least one secondary device, which is selected from among the plurality of second devices of the mobile network so that at least one unselected second device is not synchronized with the first device.

4. The method as claimed in claim 3, the method furthermore comprising obtaining, by the first device, a list identifying at least one of the at least one second device that is a neighbor of the first device in a topology of the mobile network, said selected at least one secondary device comprising said at least one neighbor second device identified in said list.

5. The method as claimed in claim 3, in which the selected at least one secondary device to which the context data are dispatched during the dispatching is recorded in the memory associated with the first device.

6. The method as claimed in claim 3, in which the method comprises receiving an identifier of a single secondary device in the mobile network, in which the selected at least one secondary device, to which the context data are dispatched during the dispatching act, comprises only said single secondary device.

7. The method as claimed in claim 3, comprising the following acts:
   detecting the at least one unselected second device, each of which is termed an obsolete device, to which the context data are not dispatched during the dispatching act and which hold in an associated memory of the obsolete device obsolete context data of the mobile terminal; and
   dispatching a deletion command to each obsolete device so as to cause deletion of the obsolete context data.

8. The method as claimed in claim 7, in which the method comprises receiving an identifier of one of said at least one second device of the mobile network which was previously connected to said mobile terminal so as to execute, as the main device in place of said first device, the network function in association with said mobile terminal;
   said at least one obsolete device being determined based on said identifier.

9. The method as claimed in claim 1, comprising dispatching an identifier of the first device to a central device of the mobile network so as to store in a centralized manner in the mobile network the identity of the first device as the main device.

10. The method as claimed in claim 1, comprising, after the act of dispatching the context data, the following acts:
    receiving an updating request originating from a second device of the at least one second device of the mobile network to which the context data have not been dispatched during the dispatching; and
    dispatching the context data in response to said updating request.

11. The method as claimed in claim 1, in which the act of determining context data associated with the mobile terminal comprises, after the act of establishing the connection with the mobile terminal:
    detecting that no context datum, associated with the mobile terminal, is contained in the memory associated with said first device;
    retrieving, from a centralized device of the mobile network, an identifier of one of said at least one second device, named a former main device, of the mobile network which was previously connected to said mobile terminal so as to execute, as the main device in place of said first device, the network function in association with said mobile terminal; and
    dispatching a synchronization request to said former main device corresponding to said identifier so as to retrieve the context data recorded by said second device.

12. The method as claimed in claim 1, wherein the network function comprises at least one of:
    a network function for managing mobility of the mobile terminal within the mobile network;
    a network function for locating a user of said mobile terminal; and
    a network function for managing sessions of the mobile terminal.

13. A non-transitory recording medium readable by a computer on which is recorded a computer program comprising instructions for performing a method of synchronization when the instructions are executed by a processor of a first device, the method being implemented by the first device, in a mobile network comprising a network core managing access to said mobile network, the first device hosting in the network core a network function serving for connecting a mobile terminal to the mobile network, said mobile network comprising at least one second device hosting in the network core said network function, the method comprising the following acts:
    establishing a connection of the mobile terminal to the first device so that said first device executes, as a main device, the network function in association with said mobile terminal;
    determining context data associated with the mobile terminal, said context data being data taken as input by the network function in order to execute, in the network core of the mobile network, the network function for connecting the mobile terminal to the mobile network;
    recording the context data in a memory associated with said first device; and
    dispatching the context data to at least one of said at least one second device, wherein each second device to which the context is dispatched is termed a secondary device, so as to synchronize the context data in said first device and said at least one secondary device, said context data being accessible by said network function in each secondary device.

14. The non-transitory recording medium as claimed in claim 13, wherein the network function comprises at least one of:
    a network function for managing mobility of the mobile terminal within the mobile network;
    a network function for locating a user of said mobile terminal; and
    a network function for managing sessions of the mobile terminal.

15. A first device hosting in a network core of a mobile network a network function, the network core managing access to said mobile network, said mobile network comprising at least one second device hosting in the network core said network function, said network function serving for connecting a mobile terminal to the mobile network, the first device comprising:
    a processor; and
    a non-transitory computer-readable medium comprising instructions stored thereon, which when executed by the processor configure the first device to perform acts comprising:
    establishing a connection of the mobile terminal to the first device so that said first device executes, as a main device, the network function in association with said mobile terminal;
    determining context data associated with the mobile terminal, said context data being data taken as input by the network function in order to execute, in the network core of the mobile network, the network function for connecting the mobile terminal to the mobile network;
    recording the context data in a memory associated with said first device; and
    dispatching the context data to at least one of said at least one second device, wherein each second device to which the context is dispatched is termed a secondary device, so as to synchronize the context data in said first device and said at least one secondary device, said context data being accessible by said network function in each secondary device.

16. The first device as claimed in claim 15, in which the mobile network comprises a plurality of second devices hosting said network function,
    the dispatching being performed to dispatch the context data only to the at least one secondary device, which is selected from among the plurality of second devices of the mobile network so that at least one unselected second device is not synchronized with the first device.

17. The first device as claimed in claim 15, wherein the network function comprises at least one of:
    a network function for managing mobility of the mobile terminal within the mobile network;
    a network function for locating a user of said mobile terminal; and
    a network function for managing sessions of the mobile terminal.

\* \* \* \* \*